United States Patent [19]

You et al.

[11] Patent Number: 5,324,811
[45] Date of Patent: Jun. 28, 1994

[54] AROMATIC POLYAMIDE PULP AND A PROCESS FOR THE PREPARATION THEREOF

[75] Inventors: Seog C. You; Young H. Park, both of Kyungsangbuk-do; Sang Y. Oh, Taegu; Chang S. Ji, Kyungsangbuk-do, all of Rep. of Korea

[73] Assignee: Kolon Industries, Inc., Seoul, Rep. of Korea

[21] Appl. No.: 875,615

[22] Filed: Apr. 28, 1992

[30] Foreign Application Priority Data

Apr. 29, 1991 [KR] Rep. of Korea .................. 6877/1991
Mar. 13, 1992 [KR] Rep. of Korea .................. 4154/1992

[51] Int. Cl.⁵ ............................................ C08G 69/28
[52] U.S. Cl. ..................................... 528/336; 428/359;
  428/364; 428/397; 428/399; 428/400; 524/606;
  524/608; 524/845; 528/348; 528/488; 528/489;
  528/499; 528/502
[58] Field of Search ............... 528/336, 348, 488, 489,
  528/499, 502; 524/606, 608, 845; 428/474.4,
  359, 364, 397, 399, 400

[56] References Cited

U.S. PATENT DOCUMENTS

3,751,546  8/1973  Horoldt et al. .
4,511,623  4/1985  Yoon et al. .
4,959,453  9/1990  Sweeny ............................ 528/336

FOREIGN PATENT DOCUMENTS

0246732  11/1987  European Pat. Off. .
871580   6/1961   Fed. Rep. of Germany .
871581   6/1961   Fed. Rep. of Germany .
1520574  8/1978   Fed. Rep. of Germany .

OTHER PUBLICATIONS

Polymer Science USSR, vol. 12, No. 10, 1970, pp. 2475-2491; A. A. Fedorov et al., "Synthesis of Polyterephthalamides of High Molecular Weight by Polycondensation in Amide-Salt Systems."
European Search Report.
Nature, vol. 326, No. 6113 (Apr. 9-15, 1987), pp. 580-582 and p. 540.

*Primary Examiner*—Morton Foelak
*Attorney, Agent, or Firm*—Finnegan, Henderson, Farabow, Garrett & Dunner

[57] ABSTRACT

A process for the preparation of aromatic polyamide pulp having excellent properties comprising:
  a) preparing a polymerization solvent by adding a Lewis acid type compound to an amide type organic solvent, an urea type organic solvent or a mixture thereof;
  b) obtaining an anisotropic liquid crystalline polymer solution prior to gelation by dissolving an aromatic diamine in the prepared polymerization solvent and adding an aromatic diacid chloride to the solution, and effecting the polymerization thereof;
  c) maintaining the polymer solution at a predetermined temperature for a predetermined period; and
  d) separating the polymerization solvent and pulverizing the polymer by pulping machine.

17 Claims, 1 Drawing Sheet

FIG.1

AROMATIC POLYAMIDE PULP AND A PROCESS FOR THE PREPARATION THEREOF

BACKGROUND OF THE INVENTION

1. Field of the Invention

The present invention relates to an aromatic polyamide pulp and a process for the preparation thereof. More particularly, the invention is concerned with an aromatic polyamide pulp prepared by a process wherein Lewis acid type compounds and, optionally, inorganic salts are added and dissolved into amide type solvents, urea type solvents or a mixture thereof, followed by pouring an aromatic diamine and an aromatic diacid chloride into the resulting solvent to obtain a highly polymerized aromatic polyamide pulp and a process therefor.

2. Discussion of the Related Art

Various processes for the preparation of aromatic polyamide pulps have been disclosed in the prior art. For example, U.S. Pat. No. 4,511,623 describes a process for the preparation of aromatic polyamide pulp which uses a mixture of an amide solvent, inorganic salts and a tertiary amine as a solvent system. However, there are several disadvantages which result from the use of an excess amount of a tertiary amine. When such an excess is used, the polymerization and gelation proceed so rapidly, i.e. in a few seconds, that the process cannot be controlled. Therefore, the reproducibility is poor. Particularly during gelation, the molecular chains are isotropic and lack orientation; thus, the polymer solution must be maintained for more than 5 hours to obtain a fine fibrous pulp with a high molecular weight. This prior art process using a tertiary amine is very expensive because of the high cost of the tertiary amine compounds. Moreover, the solubility of the polymer is so low that the ratio of polymer to polymerization solvent cannot be increased beyond a certain extent.

Japanese Patent Publication No. 59-47694 describes a process for the preparation of a pulp-like particle by reacting monomers in an amide type solvent for polymerization, immersing the resulting mixture in alcohol and pulverizing. However, in this prior art process, a polymer solution with a low inherent viscosity must be pulverized in water or alcohol so that the ultimate product has a low inherent viscosity of 2.0–3.5. Such a low inherent viscosity results in a deterioration of the properties of the polymer.

U.S. Pat. No. 4,876,040 describes a process in which a liquid crystalline polymer solution polymerized in an amide type polymerization solvent containing an inorganic salt is pressed and sprayed together with a tertiary amine in a pulping machine. However, this process requires an excess amount of an expensive tertiary amine, which results in an expensive product. Moreover, excessive use of tertiary amines produces environmental problems.

SUMMARY OF THE INVENTION

Accordingly, an object of the present invention is to provide an excellent aromatic polyamide pulp with a high molecular weight, and to provide a process for the production thereof having several advantages over prior art processes. First, it is possible to prepare polymers by a simple method which does not require an additional pulping process. Second, the present process and products made thereby are less expensive than those of the prior art, which require the use of an expensive tertiary amine. Third, the present invention can reduce environmental pollution by avoiding the use of tertiary amines, which are harmful to humans.

In order to achieve the above objects, the present invention provides an aromatic polyamide pulp by a process wherein a Lewis acid type compound, preferably selected from transition metal halides or compounds of halogen elements combined with IIIA, IVA, VA or VIA group elements of the periodic table, is added to an amide and/or urea type organic type solvent which may optionally contain an inorganic salt of an alkaline metal halide, such as $CaCl_2$, $LiCl$, $NaCl$, $KCl$, $LiBr$, $KBr$, etc. The addition of a Lewis acid type compound increases the solubility of the polymer without increasing the reaction rate, thereby permitting a high molecular weight aromatic polyamide pulp to be prepared under controlled conditions.

DETAILED DESCRIPTION OF THE PREFERRED EMBODIMENTS

The present invention provides a process for the preparation of aromatic polyamide pulp containing a homopolymer or copolymer with a repeating unit represented by formula (I) or (II)

wherein each of $R_1$, $R_2$ and $R_3$ represents one of the following aromatic group elements, -continued X is —H, —Cl, —Br, —I, $C_{1-4}$ alkyl group or $C_{1-4}$ alkoxy group, and Y is which comprises
  a) preparing a polymerization solvent by adding a Lewis acid type compound to an amide type organic solvent, a urea type organic solvent or the mixture thereof;
  b) obtaining an anisotropic liquid crystalline polymer solution prior to gelation by dissolving an aromatic diamine in the prepared polymerization solvent, adding an aromatic diacid chloride to the solution, and polymerizing said aromatic diamine and said aromatic diacid chloride;
  c) maintaining the polymer solution at a predetermined temperature for a predetermined period to mature the polymer solution, wherein the viscosity of said polymer solution increases during maturation; and
  d) separating the polymerization solvent and pulverizing the polymer.

The polymer is preferably pulverized with a pulping machine.

Furthermore, the present invention provides an aromatic polyamide pulp containing a homopolymer or copolymer with a repeating unit represented by the formula (I) or (II) by a process which comprises:
  a) preparing a polymerization solvent by adding a Lewis acid type compound to an amide type organic solvent, a urea type organic solvent or a mixture thereof;
  b) obtaining an anisotropic liquid crystalline polymer solution prior to gelation by dissolving an aromatic diamine in the prepared polymerization solvent, adding an aromatic diacid chloride to the solution, and polymerizing said aromatic diamine and said aromatic diacid chloride;
  c) maintaining the polymer solution at a predetermined temperature for a predetermined period to mature the polymer solution, wherein the viscosity of said polymer solution increases during maturation; and
  d) pulverizing the polymer.

The polymer is preferably pulverized with a pulping machine.

Step (d) of the process of the present invention can be carried out in accordance with the following two alternative methods.

In accordance with a first alternative, after the polymer is immersed in water, an aqueous basic solution or a mixed coagulating solution containing a polymerization solvent and water or an aqueous basic solution to extract the polymerization solvent from the polymer, the polymer is pulverized preferably with a pulping machine.

In accordance with a second alternative, the polymer is pulverized and then dried without separating the polymer from the polymerization solvent.

The present invention may be carried out as a continuous process or as a batch process. The present invention as a continuous process comprises the preparation of an aromatic polyamide pulp containing a homopolymer or copolymer with a repeating unit represented by the formula (I) or (II) which comprises:
  a) preparing a polymerization solvent by adding a Lewis acid type compound to an amide type organic solvent, a urea type organic solvent or a mixture thereof;
  b) obtaining an anisotropic liquid crystalline polymer solution prior to gelation by dissolving an aromatic diamine in the prepared polymerization solvent, adding an aromatic diacid chloride to the solution, and polymerizing said aromatic diamine and said aromatic diacid chloride;
  c) continuously extruding the crystalline polymer solution into a maturing container;
  d) maintaining the polymer solution at a predetermined temperature for a predetermined period to mature the polymer solution, wherein the viscosity of said polymer solution increases during maturation; and
  e) pulverizing the polymer.

The polymer is preferably pulverized with a pulping machine.

In addition, the present invention provides an aromatic polyamide pulp containing a homopolymer or copolymer with a repeating unit represented by the formula (I) or (II) by the process which comprises:
  a) preparing a polymerization solvent by adding a Lewis acid type compound to an amide type organic solvent, a urea type organic solvent or the mixture thereof;
  b) obtaining an anisotropic liquid crystalline polymer solution prior to gelation by dissolving an aromatic diamine in the prepared polymerization solvent, adding an aromatic diacid chloride to the solution, and polymerizing said aromatic diamine and said aromatic diacid chloride;
  c) continuously extruding the crystalline polymer solution into a maturing container;
  d) maintaining the polymer solution at a predetermined temperature for a predetermined period to mature the polymer solution, wherein the viscosity of said polymer increases during maturation; and
  e) pulverizing the polymer.

The polymer is preferably pulverized with a pulping machine.

The batch process according to the invention can be carried out in various ways. For instance, predetermined amounts of organic solvents, a Lewis acid type compound and, optionally, inorganic salts can be dissolved in a reactor, followed by adding a predetermined amount of an aromatic diamine and a predetermined amount of an aromatic diacid chloride to this solution. The solution is stirred as the polymerization proceeds, thereby forming the anisotropic liquid crystalline polymer solution prior to gelation. In order to allow the resulting solution to mature, the solution should be maintained at a predetermined temperature for a predetermined period. The resulting matured polymer is immersed in water, an aqueous basic solution or a mixed coagulating solution containing a polymerization solvent and either water or an aqueous basic solution to separate the polymerization solvent from the polymer. The polymer is then pulverized.

Alternatively, the matured resulting polymer can be pulverized, preferably in a pulping machine, with the mixed coagulating solution without separating the polymerization solvent from the polymer, and then dried to obtain an aromatic polyamide pulp with a high molecular weight having the desired properties.

Figure 1:
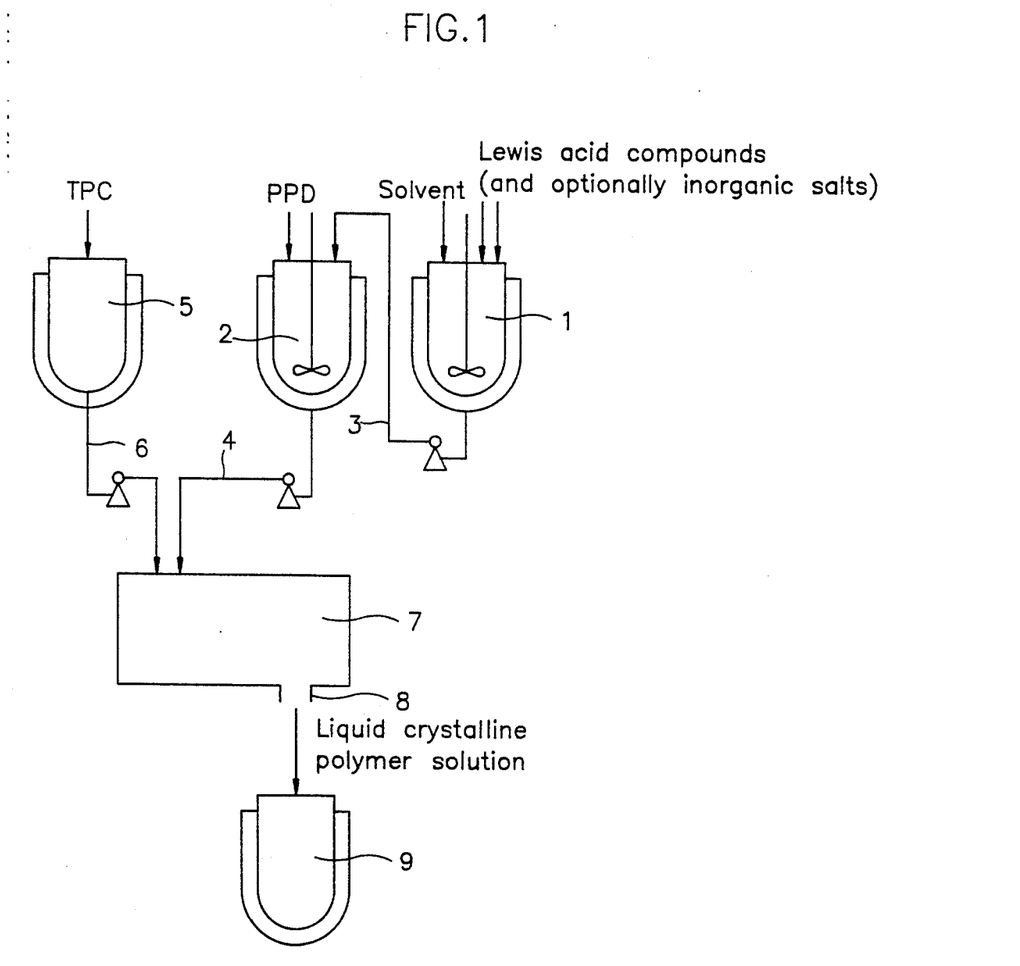
FIG. 1 is a diagrammatic illustration of a continuous process according to present invention for preparing an aromatic polyamide pulp.

As illustrated in the accompanying drawing, the continuous process according to the invention can be described as follows. First, after a Lewis acid type compound and, optionally, an inorganic salt are dissolved in a predetermined amount of organic solvent within the tank (1), the solution can be transferred into the preliminary polymerization tank (2) through the transfer line (3) by a transfer pump. A predetermined amount of aromatic diamine is added in the preliminary polymerization tank (2) at a controlled temperature while stirring the solution to completely dissolve the diamine. The resulting preliminary mixture is transferred into the reactor (7) through a transfer line (4). Simultaneously, an aromatic diacid chloride from the raw material reservoir tank (5) is transferred into the reactor (7) through transfer line (6) by a metering pump. The transferred preliminary mixture solution and the aromatic diacid chloride chemically react to produce the liquid crystalline polymer solution. The polymer solution is then continuously extruded into a maturing container (9). In this container, the liquid crystalline solution is matured by maintaining it at a predetermined temperature for a predetermined period. The polymer solution gels during maturation. The maturation step causes an increase in the viscosity of the polymer solution and increases the degree of orientation of the chains within the polymer solution. After the polymer has matured according to the above procedure, it can be immersed in water, an aqueous basic solution or a mixed coagulating solution comprising the polymerization solvent and either of the above two solutions to extract the polymerization solvent from the polymer.

Alternatively, the matured polymer can be mixed with coagulating solutions, pulverized and dried to obtain a high molecular weight aromatic polyamide pulp with the desired properties.

The present invention also comprises a process for the preparation of a homopolymer or copolymer with a repeating unit represented by the formula (I) or (II):

wherein each of $R_1$, $R_2$ and $R_3$ independently represents one of the following aromatic groups, wherein X is —H, —Cl, —Br, —I, a $C_{1-4}$ alkyl group or a $C_{1-4}$ alkoxy group, and Y is which comprises:

a) preparing a polymerization solvent by adding a Lewis acid type compound to an amide type organic solvent, an urea type organic solvent or a mixture thereof; and b) obtaining an anisotropic liquid crystalline polymer solution prior to gelation by dissolving an aromatic diamine in the polymerization solvent, adding an aromatic diacid chloride to the solvent, and polymerizing the aromatic diamine and the aromatic diacid chloride.

DESCRIPTION OF THE PREFERRED EMBODIMENTS

Reference will now be made in detail to the present preferred embodiments of the invention. In the examples and throughout the specification and claims, all parts and percentages are by weight unless otherwise specified. The process of the invention will become more apparent from the following detailed description.

(A) Preparation of polymerization solvent

In order to make the polyamide, the present invention employs an amide type organic solvent, a urea type solvent or a mixture thereof as polymerization solvent. These organic solvents can be selected from most of the amide type and urea type organic solvents, preferably N-methyl-2-pyrrolidone (NMP), N,N-dimethyl acetamide (DMAc), hexamethylphosphoramide (HMPA), N,N,N,N'-tetramethylurea (TMU), N,N-dimethylformamide (DMF) or mixtures thereof. In addition, a Lewis acid type compound selected from the transition metal halides or a compound of a halogen element combined with a IIIA, IVA, VA or VIA group element of the periodic table can be added to the polymerization solvent. Preferably, the Lewis acid type compound is selected from $BF_3$, $BCl_3$, $AlCl_3$, $FeCl_2$, $FeCl_3$, $ZnCl_2$, $SbCl_2$, $HgCl_2$, $MgCl_2$, and the like. The preferred added amount of Lewis acid type compound is 0.1–0.5% by weight based on the organic solvent. If the amount of Lewis acid is less than 0.1% by weight based on the organic solvent, no further increase in solubility and molecular weight of the ultimate polymer can be expected. If the amount is more than 15% by weight, any increase in the amount of the Lewis acid will have no effect on the solubility or molecular weight of the polymer. Lewis acid type compounds differ from one another in their ability to increase the solubility and molecular weight of the polymer. For example, $AlCl_3$ produces a greater increase in solubility and molecular weight than does $HgCl_2$. Thus, if $AlCl_3$ is used as the acid, the amount of added inorganic salts can be decreased.

In order to further increase the solubility, inorganic salts can be mixed with the polymerization solvent. In the present invention, it has been discovered that when using a mixture comprising inorganic salts and a Lewis acid type compound, as the solubility increases, the inherent viscosity of the pulp also increases. The inorganic salts are preferably selected from alkaline metal halide salts and alkaline earth metal halide salts such as $CaCl_2$, LiCl, NaCl, KCl, LiBr, KBr, and the like. One or more inorganic salts can be added. Preferably, the amount of added inorganic salts is not more than 12% by weight based on the polymerization solvent. If the amount is more than 12% by weight, no further improvement can be expected, and it is therefore not economical to add more than this amount of salt.

When both the Lewis acid type compound and inorganic salts are used in the invention in order to increase the solubility, the added amounts of Lewis acid type compounds and inorganic salts are mutually dependent, so that an increase in the added amount of Lewis acid will affect the amount of inorganic salts to be added. Therefore, the total amount of added Lewis acid type compound and inorganic salts is 2.0–25% by weight, preferably 3.0–13% by weight based on the organic solvent. If the total amount of the mixture of these compounds is less than 2.0% by weight, the solubility and molecular weight of the resulting polymer will not increase. If the total amount of the mixture is more than 25% by weight, any further increase in the amount added will not affect the solubility and molecular weight and, thus, it is not economical to further increase this amount. As described above, the polymerization solvent can be prepared by adding a Lewis type compound and, optionally, inorganic salts into the amide type solvent, urea type solvent or a mixture thereof.

(B) Preparation of liquid crystalline polymer solution

In the resulting solution, an aromatic diamine is dissolved, followed by adding aromatic diacid chloride. Preferably, the reaction temperature is 0°–40° C. If the reaction temperature is less than 0° C., the reaction will not proceed well and the solubility will decrease. If the reaction temperature is more than 40° C. the reaction rate is so fast that the reaction terminating time cannot be controlled.

Preferably, the reactants are added in such a manner that the reaction mixture contains the polymer in an amount of 3–30% by weight based on the pure polymerization solvent. If the amount of the polymer is less than 3% by weight, although the high molecular weight polyamide pulp can be obtained, the amount of polymerization solvent which is used is increased so greatly that this is not economical. If the amount of the polymer is more than 30% by weight, it is impossible to obtain a high molecular weight polyamide pulp because of the resulting decrease in solubility and molecular weight. The above reaction of the aromatic diamine and aromatic diacid chloride should proceed until the solution becomes an anisotropic liquid crystalline polymer solution prior to gelation with an inherent viscosity of 1.0–3.0. If the above reaction terminates in an isotropic state prior to the formation of a liquid crystalline polymer solution, the form and properties of the resulting polyamide pulp are qualitatively deteriorated.

(C) Maturation of liquid crystalline polymer solution

In order to permit the solution to mature, the resulting anisotropic liquid crystalline polymer solution should be maintained prior to gelation under predetermined conditions. It is preferable to maintain the solution at a temperature of from 25°–100° C. for more than 0.5 hours. However, as the length of the maturing period is increased, the degree of maturity likewise increases. This produces an increase in the inherent viscosity and the degree of molecular orientation of the polymer, as described in Nature Vol. 326, No. 6113 (Apr. 9–15, 1987). If the period is more than 5 hours, the increasing rate of the degree of maturity relative to the length of the maturing period drops sharply. Therefore, it is economically preferable that the maturing period is between 0.5 and 5 hours. If the maturing temperature is less than 25° C. then the maturing time requires an unduly long period. If the maturing temperature rises over than 100° C., the inherent viscosity of the polyamide pulp decreases so that the properties are deteriorated.

(D) Extraction of polymerization solvent

The polymerization solvent can be extracted from the polymer by immersing the matured polymer in water, an aqueous basic solution or a mixed coagulating solution of polymerization solvent containing the above solutions. Alternatively, without extraction of polymerization solvent, the matured polymer can be added into a pulping machine together with the coagulating solution, followed by pulverizing and drying to obtain the desired product. The aqueous basic solution can be selected from aqueous solutions of NaOH, KOH, $Na_2CO_3$, $Ca(OH)_2$, CaO and the like. Preferably, the concentration of these solutions is 0.1–20% by weight. If the concentration of aqueous solution is less than 0.1% by weight, the concentration is so diluted that it does not show any effect. If the concentration of aqueous solution is not less than 20% by weight, no further increase in neutralizing power and inherent viscosity can be expected.

(E) Preparation of polyamide pulp

The resulting polyamide polymer is pulverized and dried by known pulping machines to obtain polyamide pulp. The pulping machine is well known and, thus, a detailed description of the pulping machines will be omitted.

According to the above described procedure, a polyamide pulp containing a homopolymer or copolymer can be obtained which has a repeating unit expressed by the formula (I) or (II).

The polyamide pulp according to the invention is characterized by having an inherent viscosity of 4.0 or higher, a dimension of 0.1 mm-5 cm in length, 1 $\mu$m-200 $\mu$m in diameter, a crystallinity of more than 45%, an apparent crystallite size of more than 40A and a specific surface area of more than 4.0 m$^2$/g. Depending upon the pulverizing conditions, it is possible to prepare the pulp-like fibers with a length of more than 2 cm which characteristically have an average number of microfibrils branched at the fiber which is less than 10/mm.

An important effect of the invention is that without using an expensive tertiary amine, a high molecular weight aromatic polyamide pulp can be prepared by adding a Lewis acid type compound preferably selected from transition metal halides or from compounds of halogen elements combined with a IIIA, IVA, VA or VIA group element on the periodic table into an amide and/or urea type organic type solvent, and optionally adding an inorganic salt of an alkaline metal halide or an alkali earth metal halide salt such as CaCl$_2$, LiCl, NaCl, KCl, LiBr, KBr, or the like. The addition of a Lewis acid type compound increases the solubility without increasing the reaction rate so that the high molecular weight aromatic polyamide pulp can be prepared by under controllable conditions.

Because of the addition of the Lewis acid type compound, the continuous process according to the invention provides a high molecular weight pulp subjected only to an elongation force from free-falling and without additional shear force or orientation.

The inherent viscosity (I.V.) of the polymer is defined as $$I.V. \ (dl/g) = ln(\eta_{rel})/C$$

where C represents the concentration of 0.5 g of polymer in 100 ml of 95-98% by weight of sulfuric acid and relative viscosity, $\eta_{rel}$ is the ratio of the flow time between a polymer solution and solvent of 95-98% by weight of concentrated sulfuric acid. The flow time is determined at 30° C. by an Osward capillary viscometer.

The preferred examples of the present invention and comparative examples will be described below. However, these examples are provided only to facilitate the understanding of the present invention and, thus, the present invention is not limited to these examples.

EXAMPLE 1

After a 2 liter reactor was completely dried by a sufficient purge with nitrogen, 500 ml of N-methyl-2-pyrrolidone (NMP) were charged into the reactor, followed by adding 25 g of CaCl$_2$ and 10 g of AlCl$_3$ into the solvent, mixing until completely dissolved to prepare the preliminary polymerization solvent and then adding and dissolving 24.5 g of 1,4-phenylenediamine.

After holding the resulting solution in the reactor for 5 minutes, the temperature was lowered to 15° C. by cooling with water and ice, followed by adding 45.95 g of terephthaloyl chloride, and polymerizing with vigorous stirring, to obtain liquid crystalline polymer solution prior to gelation. Then the temperature of the solution was raised to 50° C. and the solution was maintained at that temperature for 2 hours. At the end of this period, the polymer was mixed with water to extract the polymerization solvent from the polymer, thereby separating the polymer. The separated polymer was pulverized in a pulping machine and dried to prepare pulp.

The physical and chemical properties of the obtained pulp are as follows:
inherent viscosity: 6.3
crystallinity: 56%
specific surface area: 7.2 m$^2$/g
length: 0.1 mm-5 cm and
diameter: 1 $\mu$m-200 $\mu$m

EXAMPLE 2

After a 2 liter reactor was completely dried by a sufficient purge with nitrogen, 500 ml of N-methyl-2-pyrrolidone (NMP) were charged into the reactor, followed by adding 25 g of CaCl$_2$ and 20 g of AlCl$_3$ into the solvent, mixing until completely dissolved to prepare the preliminary polymerization solvent and then adding and dissolving 24.5 g of 1,4-phenylenediamine.

After holding the resulting solution in the reactor for 5 minutes, the temperature was lowered to 20° C. by cooling with water and ice, followed by adding 45.95 g of terephthaloyl chloride, and polymerizing with vigorous stirring, to obtain liquid crystalline polymer solution prior to gelation. Then the temperature of the solution was raised to 60° C. and the solution was maintained at that temperature for 5 hours. At the end of this period, without separating the polymerization solvent, the polymer was charged into a pulping machine with a mixed coagulating solution of 55 parts by weight of water and 45 parts by weight of NMP in which CaCl$_2$ was dissolved. The total mixture was pulverized in the pulping machine and dried to prepare pulp.

The physical and chemical properties of the obtained pulp are as follows:
inherent viscosity: 7.1
crystallinity: 57%
specific surface area: 8.4 m$^2$/g
length: 0.1 mm-5 cm and
diameter: 1 $\mu$m -200 $\mu$m

EXAMPLE 3

After a 2 liter reactor was completely dried by a sufficient purge with nitrogen, 500 ml of N-methyl-2-pyrrolidone (NMP) were charged into the reactor, followed by adding 20 g of CaCl$_2$ and 10 g of AlCl$_3$ into the solvent, mixing until completely dissolved to prepare the preliminary polymerization solvent and then adding and dissolving 24.5 g of 1,4-phenylenediamine.

After holding the resulting solution in the reactor for 5 minutes, the temperature was lowered to 30° C. by cooling with water and ice, followed by adding 45.95 g of terephthaloyl chloride, and polymerizing with vigorous stirring, to obtain liquid crystalline polymer solution prior to gelation. Then the temperature of the solution was raised to 60° C. and the solution was maintained at that temperature for 2 hours. At the end of this period, the polymer was mixed with 10% aqueous NaOH solution to extract the polymerization solvent from the polymer, thereby separating the polymer. The separated polymer was pulverized in a pulping machine and dried to prepare pulp.

The physical and chemical properties of the obtained pulp are as follows:
  inherent viscosity: 6.2
  crystallinity: 53%
  specific surface area: 6.9 m$^2$/g
  length: 0.1 mm–5 cm and
  diameter: 1 $\mu$m –200 $\mu$m

EXAMPLE 4

After a 2 liter reactor was completely dried by a sufficient purge with nitrogen, 500 ml of N-methyl-2-pyrrolidone (NMP) were charged into the reactor, followed by adding 30 g of AlCl$_3$ into the solvent, mixing until completely dissolved to prepare the preliminary polymerization solvent and then adding and dissolving 24.5 g of 1,4-phenylenediamine.

After holding the resulting solution in the reactor for 5 minutes, the temperature was lowered to 30° C. by cooling with water and ice, followed by adding 45.95 g of terephthaloyl chloride, and polymerizing with vigorous stirring, to obtain liquid crystalline polymer solution prior to gelation. Then the temperature of the solution was raised to 70° C. and the solution was maintained at that temperature for 0.5 hour. At the end of this period, the polymer was mixed with water to extract the polymerization solvent from the polymer, thereby separating the polymer. The separated polymer was pulverized in a pulping machine and dried to prepare pulp.

The physical and chemical properties of the obtained pulp are as follows:
  inherent viscosity: 5.1
  crystallinity: 50%
  specific surface area: 5.6 m$^2$/g
  length: 0.1 mm–5 cm and
  diameter: 1 $\mu$m –200 $\mu$m

EXAMPLE 5

After a 2 liter reactor was completely dried by a sufficient purge with nitrogen, 400 ml of N-methyl-2-pyrrolidone (NMP) were charged into the reactor, followed by adding 20 g of CaCl$_2$ and 15 g of AlCl$_3$ into the solvent, mixing until completely dissolved to prepare the preliminary polymerization solvent and then adding and dissolving 24.5 g of 1,4-phenylenediamine.

After holding the resulting solution in the reactor for 5 minutes, the temperature was lowered to 20° C. by cooling with water and ice, followed by adding 45.95 g of terephthaloyl chloride, and polymerizing with vigorous stirring, to obtain liquid crystalline polymer solution prior to gelation. Then the temperature of the solution was raised to 80° C. and the solution was maintained at that temperature for 2 hours. At the end of this period, without separating the polymerization solvent, the polymer was charged into a pulping machine with a mixed coagulating solution of 70 parts by weight of water and 30 parts by weight of NMP in which CaCl$_2$ was dissolved. The total mixture was pulverized in the pulping machine and dried to prepare pulp.

The physical and chemical properties of the obtained pulp are as follows:
  inherent viscosity: 6.1
  crystallinity: 52%
  specific surface area: 6.5 m$^2$/g
  length: 0.1 mm–5 cm and
  diameter: 1 $\mu$m –200 $\mu$m

EXAMPLE 6

After a 2 liter reactor was completely dried by a sufficient purge with nitrogen, 1000 ml of N-methyl-2-pyrrolidone (NMP) were charged into the reactor, followed by adding 20 g of CaCl$_2$ and 10 g of AlCl$_3$ into the solvent, mixing until completely dissolved to prepare the preliminary polymerization solvent and then adding and dissolving 24.5 g of 1,4-phenylenediamine.

After holding the resulting solution in the reactor for 5 minutes, the temperature was lowered to 25° C. by cooling with water and ice, followed by adding 45.95 g of terephthaloyl chloride, and polymerizing with vigorous stirring, to obtain liquid crystalline polymer solution prior to gelation. Then the temperature of the solution was raised to 50° C. and the solution was maintained at that temperature for 2 hours. At the end of this period, the polymer was mixed with water to extract the polymerization solvent from the polymer, thereby separating the polymer. The separated polymer was pulverized in a pulping machine and dried to prepare pulp.

The physical and chemical properties of the obtained pulp are as follows:
  inherent viscosity: 7.5
  crystallinity: 59%
  specific surface area: 10.3 m$^2$/g
  length: 0.1 mm–5 cm and
  diameter: 1 $\mu$m –200 $\mu$m

EXAMPLE 7

After a 2 liter reactor was completely dried by a sufficient purge with nitrogen, 500 ml of N-methyl-2-pyrrolidone (NMP) were charged into the reactor, followed by adding 30 g of CaCl$_2$ and 5 g of AlCl$_3$ into the solvent, mixing until completely dissolved to prepare the preliminary polymerization solvent and then adding and dissolving 24.5 g of 1,4-phenylenediamine.

After holding the resulting solution in the reactor for 5 minutes, the temperature was lowered to 20° C. by cooling with water and ice, followed by adding 45.95 g of terephthaloyl chloride, and polymerizing with vigorous stirring, to obtain liquid crystalline polymer solution prior to gelation. Then the temperature of the solution was raised to 50° C. and the solution was maintained at that temperature for 2 hours. At the end of this period, the polymer was mixed with water to extract the polymerization solvent from the polymer, thereby separating the polymer. The separated polymer was pulverized in a pulping machine and dried to prepare pulp.

The physical and chemical properties of the obtained pulp are as follows:
  inherent viscosity: 5.7
  crystallinity: 52%
  specific surface area: 6.8 m$^2$/g
  length: 0.1 mm–5 cm and
  diameter: 1 $\mu$m –200 $\mu$m

EXAMPLE 8

After a 2 liter reactor was completely dried by a sufficient purge with nitrogen, 500 ml of N-methyl-2-pyrrolidone (NMP) were charged into the reactor, followed by adding 30 g of CaCl$_2$ and 5 g of AlCl$_3$ into the solvent, mixing until completely dissolved to prepare the preliminary polymerization solvent and then adding and dissolving 24.5 g of 1,4-phenylenediamine.

After holding the resulting solution in the reactor for 5 minutes, the temperature was lowered to 20° C. by cooling with water and ice, followed by adding 45.95 g of terephthaloyl chloride, and polymerizing with vigorous stirring, to obtain liquid crystalline polymer solution prior to gelation. Then the temperature of the solution was raised to 50° C. and the solution was maintained at that temperature for 5 hours. At the end of this period, the polymer was mixed with aqueous 1% KOH solution to extract the polymerization solvent from the polymer, thereby separating the polymer. The separated polymer was pulverized in a pulping machine and dried to prepare pulp.

The physical and chemical properties of the obtained pulp are as follows:
inherent viscosity: 4.4
crystallinity: 48%
specific surface area: 5.8 m$^2$/g
length: 0.1 mm–5 cm and
diameter: 1 $\mu$m –200 $\mu$m

EXAMPLE 9

After 50000 ml of N-methyl-2-pyrrolidone (NMP) were charged into a tank (1) for preparing a polymerization solvent, 2500 g of CaCl$_2$ and 1000 g of MgCl$_2$ were added and completely dissolved to prepare a preliminary polymerization solvent, which was transferred to a preliminary polymerization tank (2) through a transfer line (3) by using a transfer pump. Subsequently, 2450 g of 1,4-phenylenediamine (PPD) were added into the preliminary polymerization tank (2) and dissolved.

After the temperature of the completely dissolved resulting solution was lowered to 20° C., it was transferred to a reactor (7) through a transfer line (4) by using a metering pump. At this time, the solution was charged continuously by constant amounts into the reactor (7). At the same time, 4596 g of terephthaloyl chloride contained in a raw material-reserving tank (5) were charged continuously into the reactor (7) through a transfer line (6). At this time, the amounts of PPD solution and TPC were controlled to be equal molar amounts. Then the mixture in the reactor (7) was reacted to prepare a liquid crystalline polymer solution, which was then extruded continuously through a extrude opening ( 8 ) into a maturing container (9).

The liquid crystalline polymer solution contained in the container was raised to 50° C. and was maintained for 2 hours. At the end of this period, the polymer was cut to an appropriate size and was charged into a pulping machine together with the a coagulating solution of 95 parts by weight of water and 5 parts by weight of NMP in which CaCl$_2$ was dissolved. The total mixture was pulverized in the pulping machine and dried to prepare pulp.

The physical and chemical properties of the obtained pulp are as follows:
inherent viscosity: 6.8
crystallinity: 57%
specific surface area: 9.5 m$^2$/g
length: 0.1 mm–5 cm and
diameter: 1 $\mu$m –200 $\mu$m

EXAMPLE 10

After 50000 ml of N-methyl-2-pyrrolidone (NMP) were charged into a tank (1) for preparing a polymerization solvent, 3000 g of CaCl$_2$ and 100 kg of MgCl$_2$ were added and completely dissolved to prepare a preliminary polymerization solvent, which was transferred to a preliminary polymerization tank (2) through a transfer line (3) by using a transfer pump. Subsequently, 2450 g of 1,4-phenylenediamine (PPD) were added into the preliminary polymerization tank (2) and dissolved.

After the temperature of the completely dissolved resulting solution was lowered to 20° C. it was transferred to a reactor (7) through a transfer line (4) by using a metering pump. At this time, the solution was charged continuously by constant amounts into the reactor (7). At the same time, 4596 g of terephthaloyl chloride contained in a raw material-reserving tank (5) were charged continuously into the reactor (7) through a transfer line (6). At this time, the amounts of PPD solution and TPC were controlled to be equal molar amounts. Then the mixture in the reactor (7) was reacted to prepare a liquid crystalline polymer solution, which was then extruded continuously through a discharge opening ( 8 ) into a maturing container ( 9 ).

The liquid crystalline polymer solution contained in the container was raised to 50° C. and was maintained for 5 hours. At the end of this period, the polymer was cut to an appropriate size and was immersed into aqueous 5% KOH solution to extract the polymerization solvent, thereby separating the polymer. The separated polymer was pulverized in a pulping machine and dried to prepare pulp.

The physical and chemical properties of the obtained pulp are as follows:
inherent viscosity: 5.3
crystallinity: 50%
specific surface area: 5.1 m$^2$/g
length: 0.1 mm–5 cm and
diameter: 1 $\mu$m –200 $\mu$m

EXAMPLE 11

After a 2 liter reactor was completely dried by a sufficient purge with nitrogen, 400 ml of N-methyl-2-pyrrolidone (NMP) were charged into the reactor, followed by adding 30 g of BF$_3$ into the solvent, mixing until completely dissolved to prepare the preliminary polymerization solvent the temperature of which was raised to 40° C. and then adding and dissolving 24.5 g of 1,4-phenylenediamine.

After holding the resulting solution in the reactor for 5 minutes, the temperature was lowered to 10° C. by cooling with water and ice, followed by adding 45.95 g of terephthaloyl chloride, and polymerizing with vigorous stirring, to obtain liquid crystalline polymer solution prior to gelation. Then the temperature of the solution was raised to 40° C. and the solution was maintained at that temperature for 2 hours. At the end of this period, the polymer was mixed with water to extract the polymerization solvent from the polymer, thereby separating the polymer. The separated polymer was pulverized in a pulping machine and dried to prepare pulp.

The measured inherent viscosity of the obtained pulp is 4.3.

EXAMPLE 12

After a 2 liter reactor was completely dried by a sufficient purge with nitrogen, 500 ml of N-methyl-2-pyrrolidone (NMP) were charged into the reactor, followed by adding 25 g of CaCl$_2$ and 10 g of AlCl$_3$ into the solvent, mixing until completely dissolved to prepare the preliminary polymerization solvent and then adding and dissolving 24.5 g of 1,4-phenylenediamine.

After holding the resulting solution in the reactor for 5 minutes, the temperature was lowered to 15° C. by cooling with water and ice, followed by adding 45.95 g of terephthaloyl chloride, and polymerizing with vigorous stirring, to obtain liquid crystalline polymer solution prior to gelation. Then the temperature of the solution was raised to 50° C. and the solution was maintained at that temperature for 2 hours. At the end of this period, the polymer was mixed with water to extract the polymerization solvent from the polymer, thereby separating the polymer. The separated polymer was pulverized in a pulping machine and dried to prepare pulp.

The measured inherent viscosity of the obtained pulp is 6.3.

EXAMPLE 13

After a 2 liter reactor was completely dried by a sufficient purge with nitrogen, 500 ml of N-methyl-2-pyrrolidone (NMP) were charged into the reactor, followed by adding 25 g of $CaCl_2$ and 10 g of $AlCl_3$ into the solvent, mixing until completely dissolved to prepare the preliminary polymerization solvent and then adding and dissolving 24.5 g of 1,4-phenylenediamine.

After holding the resulting solution in the reactor for 5 minutes, the temperature was lowered to 15° C. by cooling with water and ice, followed by adding 45.95 g of terephthaloyl chloride, and polymerizing with vigorous stirring, to obtain liquid crystalline polymer solution prior to gelation. Then the temperature of the solution was raised to 50° C. and the solution was maintained at that temperature for 2 hours. At the end of this period, the polymer was mixed with aqueous 5 wt. % NaOH solution to extract the polymerization solvent from the polymer, thereby separating the polymer. The separated polymer was pulverized in a pulping machine and dried to prepare pulp.

The measured inherent viscosity of the obtained pulp is 6.5.

EXAMPLE 14

After a 2 liter reactor was completely dried by a sufficient purge with nitrogen, 500 ml of N-methyl-2-pyrrolidone (NMP) were charged into the reactor, followed by adding 25 g of $CaCl_2$ and 20 g of $ZnCl_2$ into the solvent, mixing until completely dissolved to prepare the preliminary polymerization solvent and then adding and dissolving 24.5 g of 1,4-phenylenediamine.

After holding the resulting solution in the reactor for 5 minutes, the temperature was lowered to 15° C. by cooling with water and ice, followed by adding 45.95 g of terephthaloyl chloride, and polymerizing with vigorous stirring, to obtain liquid crystalline polymer solution prior to gelation. Then the temperature of the solution was raised to 50° C. and the solution was maintained at that temperature for 2 hours. At the end of this period, the polymer was mixed with aqueous 5 wt. % NaOH solution to extract the polymerization solvent from the polymer, thereby separating the polymer. The separated polymer was pulverized in a pulping machine and dried to prepare pulp.

The measured inherent viscosity of the obtained pulp is 5.2.

EXAMPLE 15

After a 2 liter reactor was completely dried by a sufficient purge with nitrogen, 500 ml of N-methyl-2-pyrrolidone (NMP) were charged into the reactor, followed by adding 25 g of $CaCl_2$ and 20 g of $FeCl_3$ into the solvent, mixing until completely dissolved to prepare the preliminary polymerization solvent and then adding and dissolving 24.5 g of 1,4-phenylenediamine.

After holding the resulting solution in the reactor for 5 minutes, the temperature was lowered to 15° C. by cooling with water and ice, followed by adding 45.95 g of terephthaloyl chloride, and polymerizing with vigorous stirring, to obtain liquid crystalline polymer solution prior to gelation. Then the temperature of the solution was raised to 50° C. and the solution was maintained at that temperature for 2 hours. At the end of this period, the polymer was mixed with aqueous 5 wt. % NaOH solution to extract the polymerization solvent from the polymer, thereby separating the polymer. The separated polymer was pulverized in a pulping machine and dried to prepare pulp.

The measured inherent viscosity of the obtained pulp is 4.9.

EXAMPLE 16

After a 2 liter reactor was completely dried by a sufficient purge with nitrogen, 500 ml of N-methyl-2-pyrrolidone (NMP) were charged into the reactor, followed by adding 25 g of $CaCl_2$ and 10 g of $AlCl_3$ into the solvent, mixing until completely dissolved to prepare the preliminary polymerization solvent and then adding and dissolving 24.5 g of 1,4-phenylenediamine.

After holding the resulting solution in the reactor for 5 minutes, the temperature was lowered to 5° C. by cooling with water and ice, followed by adding 45.95 g of terephthaloyl chloride, and polymerizing with vigorous stirring, to obtain liquid crystalline polymer solution prior to gelation. Then the temperature of the solution was raised to 50° C. and the solution was maintained at that temperature for 2 hours. At the end of this period, the polymer was mixed with water to extract the polymerization solvent from the polymer, thereby separating the polymer. The separated polymer was pulverized in a pulping machine and dried to prepare pulp.

The measured inherent viscosity of the obtained pulp is 6.1.

EXAMPLE 17

After a 2 liter reactor was completely dried by a sufficient purge with nitrogen, 500 ml of N-methyl-2-pyrrolidone (NMP) were charged into the reactor, followed by adding 25 g of $CaCl_2$ and 10 g of $AlCl_3$ into the solvent, mixing until completely dissolved to prepare the preliminary polymerization solvent and then adding and dissolving 24.5 g of 1,4-phenylenediamine.

After holding the resulting solution in the reactor for 5 minutes, the temperature was lowered to 0° C. by cooling with water and ice, followed by adding 45.95 g of terephthaloyl chloride, and polymerizing with vigorous stirring, to obtain liquid crystalline polymer solution prior to gelation. Then the temperature of the solution was raised to 50° C. and the solution was maintained at that temperature for 2 hours. At the end of this period, the polymer was mixed with water to extract the polymerization solvent from the polymer, thereby separating the polymer. The separated polymer was pulverized in a pulping machine and dried to prepare pulp.

The measured inherent viscosity of the obtained pulp is 5.8.

EXAMPLE 18

After a 2 liter reactor was completely dried by a sufficient purge with nitrogen, 500 ml of N-methyl-2-pyrrolidone (NMP) were charged into the reactor, followed by adding 25 g of $CaCl_2$ and 10 g of $AlCl_3$ into the solvent, mixing until completely dissolved to prepare the preliminary polymerization solvent and then adding and dissolving 24.5 g of 1,4-phenylenediamine.

After holding the resulting solution in the reactor for 5 minutes, the temperature was lowered to 0° C. by cooling with water and ice, followed by adding 45.95 g of terephthaloyl chloride, and polymerizing with vigorous stirring, to obtain liquid crystalline polymer solution prior to gelation. Then the temperature of the solution was raised to 100° C. and the solution was maintained at that temperature for 0.5 hour. At the end of this period, the polymer was mixed with water to extract the polymerization solvent from the polymer, thereby separating the polymer. The separated polymer was pulverized in a pulping machine and dried to prepare pulp.

The measured inherent viscosity of the obtained pulp is 5.1.

EXAMPLE 19

After a 2 liter reactor was completely dried by a sufficient purge with nitrogen, 500 ml of N-methyl-2-pyrrolidone (NMP) were charged into the reactor, followed by adding 25 g of $CaCl_2$ and 20 g of $AlCl_3$ into the solvent, mixing until completely dissolved to prepare the preliminary polymerization solvent and then adding and dissolving 24.5 g of 1,4-phenylenediamine.

After holding the resulting solution in the reactor for 5 minutes, the temperature was lowered to 20° C. by cooling with water and ice, followed by adding 45.95 g of terephthaloyl chloride, and polymerizing with vigorous stirring, to obtain liquid crystalline polymer solution prior to gelation. Then the temperature of the solution was raised to 60° C. and the solution was maintained at that temperature for 5 hours. At the end of this period, without separating the polymerization solvent, the polymer was charged into a pulping machine with a mixed coagulating solution of 55 wt. % by weight of water and 45 wt. % by weight of polymerization solvent. The total mixture was pulverized in the pulping machine and dried to prepare pulp.

The measured inherent viscosity of the obtained pulp is 7.1.

EXAMPLE 20

After a 2 liter reactor was completely dried by a sufficient purge with nitrogen, 500 ml of N-methyl-2-pyrrolidone (NMP) were charged into the reactor, followed by adding 20 g of $CaCl_2$ and 10 g of $AlCl_3$ into the solvent, mixing until completely dissolved to prepare the preliminary polymerization solvent and then adding and dissolving 24.5 g of 1,4-phenylenediamine.

After holding the resulting solution in the reactor for 5 minutes, the temperature was lowered to 30° C. by cooling with water and ice, followed by adding 45.95 g of terephthaloyl chloride, and polymerizing with vigorous stirring, to obtain liquid crystalline polymer solution prior to gelation. Then the temperature of the solution was raised to 60° C. and the solution was maintained at that temperature for 5 hours. At the end of this period, the polymer was mixed with water to extract the polymerization solvent from the polymer, thereby separating the polymer. The separated polymer was pulverized in a pulping machine and dried to prepare pulp.

The measured inherent viscosity of the obtained pulp is 6.0.

EXAMPLES 21 TO 23

The procedure of Example 20 was repeated except that Lewis acid compounds and coagulating solutions listed in the Table 1 below were used instead of those used in Example 20, thereby preparing aromatic polyamide pulp. The measured inherent viscosities of the obtained pulps are listed in the Table 1.

TABLE 1

| Example | Lewis acid | coagulating solution | inherent viscosity |
|---------|-----------|---------------------|-------------------|
| 21 | $AlCl_3$: 10 g | aqueous 10 wt % NaOH solution | 6.2 |
| 22 | $HgCl_2$: 10 g | water | 4.5 |
| 23 | $SbCl_2$: 10 g | water | 4.3 |

EXAMPLE 24

After a 2 liter reactor was completely dried by a sufficient purge with nitrogen, 500 ml of N-methyl-2-pyrrolidone (NMP) were charged into the reactor, followed by adding 30 g of $AlCl_3$ into the solvent, mixing until completely dissolved to prepare the preliminary polymerization solvent and then adding and dissolving 24.5 g of 1,4-phenylenediamine.

After holding the resulting solution in the reactor for 5 minutes, the temperature was lowered to 30° C. by cooling with water and ice, followed by adding 45.95 g of terephthaloyl chloride, and polymerizing with vigorous stirring, to obtain liquid crystalline polymer solution. Then the temperature of the solution was raised to 70° C. and the solution was maintained at that temperature for 0.5 hour. At the end of this period, the polymer was mixed with water to extract the polymerization solvent from the polymer, thereby separating the polymer. The separated polymer was pulverized in a pulping machine and dried to prepare the pulp.

The measured inherent viscosity of the obtained pulp is 5.1.

EXAMPLE 25

After a 2 liter reactor was completely dried by a sufficient purge with nitrogen, 500 ml of N-methyl-2-pyrrolidone (NMP) were charged into the reactor, followed by adding 30 g of $AlCl_3$ into the solvent, mixing until completely dissolved to prepare the preliminary polymerization solvent and then adding and dissolving 24.5 g of 1,4-phenylenediamine.

After holding the resulting solution in the reactor for 5 minutes, the temperature was lowered to 30° C. by cooling with water and ice, followed by adding 45.95 g of terephthaloyl chloride, and polymerizing with vigorous stirring, to obtain liquid crystalline polymer solution. Then the temperature of the solution was raised to 70° C. and the solution was maintained at that temperature for 3 hours. At the end of this period, the polymer was mixed with water to extract the polymerization solvent from the polymer, thereby separating the polymer. The separated polymer was pulverized in a pulping machine and dried to prepare the pulp.

The measured inherent viscosity of the obtained pulp is 5.5.

EXAMPLE 26

After a 2 liter reactor was completely dried by a sufficient purge with nitrogen, 400 ml of N-methyl-2-pyrrolidone (NMP) were charged into the reactor, followed by adding 25 g of $CaCl_2$ and 10 g of $AlCl_3$ into the solvent, mixing until completely dissolved to prepare the preliminary polymerization solvent and then adding and dissolving 24.5 g of 1,4-phenylenediamine.

After holding the resulting solution in the reactor for 5 minutes, the temperature was lowered to 20° C. by cooling with water and ice, followed by adding 45.95 g of terephthaloyl chloride, and polymerizing with vigorous stirring, to obtain liquid crystalline polymer solution. Then the temperature of the solution was raised to 60° C. and the solution was maintained at that temperature for 4 hours. At the end of this period, the polymer was mixed with water to extract the polymerization solvent from the polymer, thereby separating the polymer. The separated polymer was pulverized in a pulping machine and dried to prepare the pulp.

The measured inherent viscosity of the obtained pulp is 5.8.

EXAMPLES 27 TO 29

The procedure of Example 26 was repeated except that the coagulating solutions listed in the Table 2 below were used instead of that used in Example 26, thereby preparing aromatic polyamide pulp. The measured inherent viscosities of the obtained pulps are listed in the Table 2.

TABLE 2

| Example | coagulating solution | inherent viscosity |
|---|---|---|
| 27 | aqueous 20 wt % NaOH solution | 6.2 |
| 28 | aqueous 10 wt % $NaHCO_3$ solution | 6.0 |
| 29 | aqueous 10 wt % KOH solution | 6.1 |

EXAMPLE 30

After a 2 liter reactor was completely dried by a sufficient purge with nitrogen, 400 ml of N-methyl-2-pyrrolidone (NMP) were charged into the reactor, followed by adding 20 g of $CaCl_2$ and 15 g of $AlCl_3$ into the solvent, mixing until completely dissolved to prepare the preliminary polymerization solvent and then adding and dissolving 24.5 g of 1,4-phenylenediamine. After holding the resulting solution in the reactor for 5 minutes, the temperature was lowered to 20° C. by cooling with water and ice, followed by adding 45.95 g of terephthaloyl chloride, and polymerizing with vigorous stirring, to obtain liquid crystalline polymer. Then the temperature of the solution was raised to 80° C. and the solution was maintained at that temperature for 2 hours. At the end of this period, without separating the polymerizing solvent, the polymer was charged into a pulping machine with a mixed coagulating solution of 70 wt. % of water and 30 wt. % of the polymerization solvent. Total mixture was pulverized in the pulping machine and dried to prepare pulp.

The measured inherent viscosity of the obtained pulp is 6.1.

EXAMPLE 31

After a 2 liter reactor was completely dried by a sufficient purge with nitrogen, 400 ml of N-methyl-2-pyrrolidone (NMP) were charged into the reactor, followed by adding 10 g of $CaCl_2$ and 30 g of $AlCl_3$ into the solvent, mixing until completely dissolved to prepare the preliminary polymerization solvent and then adding and dissolving 24.5 g of 1,4-phenylenediamine.

After holding the resulting solution in the reactor for 5 minutes, the temperature was lowered to 25° C. by cooling with water and ice, followed by adding 45.95 g of terephthaloyl chloride, and polymerizing with vigorous stirring, to obtain liquid crystalline polymer solution. Then the temperature of the solution was raised to 60° C. and the solution was maintained at that temperature for 4 hours. At the end of this period, the polymer was mixed with water to extract the polymerization solvent from the polymer, thereby separating the polymer. The separated polymer was pulverized in a pulping machine and dried to prepare the pulp.

The measured inherent viscosity of the obtained pulp is 6.4.

EXAMPLE 32

After a 2 liter reactor was completely dried by a sufficient purge with nitrogen, 400 ml of N-methyl-2-pyrrolidone (NMP) were charged into the reactor, followed by adding 30 g of $AlCl_3$ into the solvent, mixing until completely dissolved to prepare the preliminary polymerization solvent and then adding and dissolving 24.5 g of 1,4-phenylenediamine.

After holding the resulting solution in the reactor for 5 minutes, the temperature was lowered to 35° C. by cooling with water and ice, followed by adding 45.95 g of terephthaloyl chloride, and polymerizing with vigorous stirring, to obtain liquid crystalline polymer solution. Then the temperature of the solution was raised to 60° C. and the solution was maintained at that temperature for 4 hours. At the end of this period, the polymer was mixed with water to extract the polymerization solvent from the polymer, thereby separating the polymer. The separated polymer was pulverized in a pulping machine and dried to prepare the pulp.

The measured inherent viscosity of the obtained pulp is 4.5.

EXAMPLE 33

After a 2 liter reactor was completely dried by a sufficient purge with nitrogen, 300 ml of N-methyl-2-pyrrolidone (NMP) were charged into the reactor, followed by adding 25 g of $CaCl_2$ and 15 g of $AlCl_3$ into the solvent, mixing until completely dissolved to prepare the preliminary polymerization solvent and then adding and dissolving 24.5 g of 1,4-phenylenediamine.

After holding the resulting solution in the reactor for 5 minutes, the temperature was lowered to 25° C. by cooling with water and ice, followed by adding 45.95 g of terephthaloyl chloride, and polymerizing with vigorous stirring, to obtain a liquid crystalline polymer solution. Then the temperature of the solution was raised to 50° C. and the solution was maintained at that temperature for 5 hours. At the end of this period, the polymer was mixed with water to extract the polymerization solvent from the polymer, thereby separating the polymer. The separated polymer was pulverized in a pulping machine and dried to prepare the pulp.

The measured inherent viscosity of the obtained pulp is 5.6.

EXAMPLE 34

After a 2 liter reactor was completely dried by a sufficient purge with nitrogen, 200 ml of hexamethylphosphoramide (HMPA) and 100 ml of N-methyl-2-pyrrolidone (NMP) were charged into the reactor, followed by adding 25 g of $CaCl_2$ and 15 g of $AlCl_3$ into the solvent, mixing until completely dissolved to prepare the preliminary polymerization solvent and then adding and dissolving 24.5 g of 1,4-phenylenediamine.

After holding the resulting solution in the reactor for 5 minutes, the temperature was lowered to 25° C. by cooling with water and ice, followed by adding 45.95 g of terephthaloyl chloride, and polymerizing with vigorous stirring, to obtain liquid crystalline polymer solution. Then the temperature of the solution was raised to 50° C. and the solution was maintained at that temperature for 5 hours. At the end of this period, the polymer was mixed with water to extract the polymerization solvent from the polymer, thereby separating the polymer. The separated polymer was pulverized in a pulping machine and dried to prepare the pulp.

The measured inherent viscosity of the obtained pulp is 6.0.

EXAMPLE 35

After a 2 liter reactor was completely dried by a sufficient purge with nitrogen, 300 ml of N-methyl-2-pyrrolidone (NMP) were charged into the reactor, followed by adding 17 g of LiCl and 15 g of $AlCl_3$ into the solvent, mixing until completely dissolved to prepare the preliminary polymerization solvent and then adding and dissolving 24.5 g of 1,4-phenylenediamine.

After holding the resulting solution in the reactor for 5 minutes, the temperature was lowered to 25° C. by cooling with water and ice, followed by adding 45.95 g of terephthaloyl chloride, and polymerizing with vigorous stirring, to obtain liquid crystalline polymer solution. Then the temperature of the solution was raised to 50° C. and the solution was maintained at that temperature for 5 hours. At the end of this period, the polymer was mixed with water to extract the polymerization solvent from the polymer, thereby separating the polymer. The separated polymer was pulverized in a pulping machine and dried to prepare the pulp.

The measured inherent viscosity of the obtained pulp is 5.6.

EXAMPLE 36

After a 2 liter reactor was completely dried by a sufficient purge with nitrogen, 300 ml of N-dimethylacetamide (DMAc) was charged into the reactor, followed by adding 20 g of LiCl and 15 g of $AlCl_3$ into the solvent, mixing until completely dissolved to prepare the preliminary polymerization solvent and then adding and dissolving 24.5 g of 1,4-phenylenediamine.

After holding the resulting solution in the reactor for 5 minutes, the temperature was lowered to 25° C. by cooling with water and ice, followed by adding 45.95 g of terephthaloyl chloride, and polymerizing with vigorous stirring, to obtain liquid crystalline polymer solution. Then the temperature of the solution was raised to 50° C. and the solution was maintained at that temperature for 5 hours. At the end of this period, the polymer was mixed with water to extract the polymerization solvent from the polymer, thereby separating the polymer. The separated polymer was pulverized in a pulping machine and dried to prepare the pulp.

The measured inherent viscosity of the obtained pulp is 4.9.

EXAMPLE 37

After a 2 liter reactor was completely dried by a sufficient purge with nitrogen, 200 ml of hexamethylphosphoramide (HMPA) and 100 ml of N-methyl-2-pyrrolidone (NMP) were charged into the reactor, followed by adding 25 g of $CaCl_2$ and 15 g of $ZnCl_2$ into the solvent, mixing until completely dissolved to prepare the preliminary polymerization solvent and then adding and dissolving 24.5 g of 1,4-phenylenediamine.

After holding the resulting solution in the reactor for 5 minutes, the temperature was lowered to 25° C. by cooling with water and ice, followed by adding 45.95 g of terephthaloyl chloride, and polymerizing with vigorous stirring, to obtain liquid crystalline polymer solution. Then the temperature of the solution was raised to 50° C. and the solution was maintained at that temperature for 5 hours. At the end of this period, the polymer was mixed with water to extract the polymerization solvent from the polymer, thereby separating the polymer. The separated polymer was pulverized in a pulping machine and dried to prepare the pulp.

The measured inherent viscosity of the obtained pulp is 4.7.

EXAMPLE 38

After a 2 liter reactor was completely dried by a sufficient purge with nitrogen, 1000 ml of N-methyl-2-pyrrolidone (NMP) were charged into the reactor, followed by adding 25 g of $CaCl_2$ and 10 g of $AlCl_3$ into the solvent, mixing until completely dissolved to prepare the preliminary polymerization solvent and then adding and dissolving 24.5 g of 1,4-phenylenediamine.

After holding the resulting solution in the reactor for 5 minutes, the temperature was lowered to 25° C. by cooling with water and ice, followed by adding 45.95 g of terephthaloyl chloride, and polymerizing with vigorous stirring, to obtain liquid crystalline polymer solution. Then, the temperature of the solution was maintained at 50° C. and the solution was stored for 2 hours. At the end of this period, the polymer was mixed with water to extract the polymerization solvent from the polymer, thereby separating the polymer. The separated polymer was pulverized in a pulping machine and dried to prepare the pulp.

The measured inherent viscosity of the obtained pulp is 7.5.

EXAMPLE 39

After a 2 liter reactor was completely dried by a sufficient purge with nitrogen, 200 ml of N-methyl-2-pyrrolidone (NMP) were charged into the reactor, followed by adding 20 g of $CaCl_2$ and 20 g of $AlCl_3$ into the solvent, mixing until completely dissolved to prepare the preliminary polymerization solvent and then adding and dissolving 24.5 g of 1,4-phenylenediamine.

After holding the resulting solution in the reactor for 5 minutes, the temperature was lowered to 30° C. by cooling with water and ice, followed by adding 45.95 g of terephthaloyl chloride, and polymerizing with vigorous stirring, to obtain liquid crystalline polymer solution. Then the temperature of the solution was raised to 40° C. and the solution was maintained at that temperature for 5 hours. At the end of this period, the polymer was mixed with water to extract the polymerization solvent from the polymer, thereby separating the polymer. The separated polymer was pulverized in a pulping machine and dried to prepare the pulp.

The measured inherent viscosity of the obtained pulp is 4.2.

EXAMPLE 40

After a 2 liter reactor was completely dried by a sufficient purge with nitrogen, 150 ml of hexamethylphosphoramide (HMPA) and 50 ml of N-methyl-2-pyrrolidone (NMP) were charged into the reactor, followed by adding 20 g of $CaCl_2$ and 20 g of $BCl_3$ into the solvent, mixing until completely dissolved to prepare the preliminary polymerization solvent and then adding and dissolving 24.5 g of 1,4-phenylenediamine.

After holding the resulting solution in the reactor for 5 minutes, the temperature was lowered to 30° C. by cooling with water and ice, followed by adding 45.95 g of terephthaloyl chloride, and polymerizing with vigorous stirring, to obtain liquid crystalline polymer solution. Then the temperature of the solution was raised to 40° C. and the solution was maintained at that temperature for 5 hours. At the end of this period, the polymer was mixed with water to extract the polymerization solvent from the polymer, thereby separating the polymer. The separated polymer was pulverized in a pulping machine and dried to prepare the pulp.

The measured inherent viscosity of the obtained pulp is 4.3.

EXAMPLE 41

After a 2 liter reactor was completely dried by a sufficient purge with nitrogen, 500 ml of N-methyl-2-pyrrolidone (NMP) were charged into the reactor, followed by adding 30 g of $CaCl_2$ and 5 g of $AlCl_3$ into the solvent, mixing until completely dissolved to prepare the preliminary polymerization solvent and then adding and dissolving 24.5 g of 1,4-phenylenediamine.

After holding the resulting solution in the reactor for 5 minutes, the temperature was lowered to 20° C. by cooling with water and ice, followed by adding 45.95 g of terephthaloyl chloride, and polymerizing with vigorous stirring, to obtain liquid crystalline polymer solution. Then the temperature of the solution was raised to 50° C. and the solution was maintained at that temperature for 5 hours. At the end of this period, the polymer was mixed with water to extract the polymerization solvent from the polymer, thereby separating the polymer. The separated polymer was pulverized in a pulping machine and dried to prepare the pulp.

The measured inherent viscosity of the obtained pulp is 5.7.

EXAMPLE 42

After a 2 liter reactor was completely dried by a sufficient purge with nitrogen, 500 ml of N-methyl-2-pyrrolidone (NMP) were charged into the reactor, followed by adding 30 g of $CaCl_2$ and 5 g of $ZnCl_2$ into the solvent, mixing until completely dissolved to prepare the preliminary polymerization solvent and then adding and dissolving 24.5 g of 1,4-phenylenediamine.

After holding the resulting solution in the reactor for 5 minutes, the temperature was lowered to 20° C. by cooling with water and ice, followed by adding 45.95 g of terephthaloyl chloride, and polymerizing with vigorous stirring, to obtain liquid crystalline polymer solution. Then the temperature of the solution was raised to 50° C. and the solution was maintained at that temperature for 5 hours. At the end of this period, the polymer was mixed with water to extract the polymerization solvent from the polymer, thereby separating the polymer. The separated polymer was pulverized in a pulping machine and dried to prepare the pulp.

The measured inherent viscosity of the obtained pulp is 4.3.

EXAMPLE 43

After a 2 liter reactor was completely dried by a sufficient purge with nitrogen, 500 ml of N-methyl-2-pyrrolidone (NMP) were charged into the reactor, followed by adding 30 g of $CaCl_2$ and 5 g of $FeCl_3$ into the solvent, mixing until completely dissolved to prepare the preliminary polymerization solvent and then adding and dissolving 24.5 g of 1,4-phenylenediamine.

After holding the resulting solution in the reactor for 5 minutes, the temperature was lowered to 20° C. by cooling with water and ice, followed by adding 45.95 g of terephthaloyl chloride, and polymerizing with vigorous stirring, to obtain liquid crystalline polymer solution. Then the temperature of the solution was raised to 50° C. and the solution was maintained at that temperature for 5 hours. At the end of this period, the polymer was mixed with water to extract the polymerization solvent from the polymer, thereby separating the polymer. The separated polymer was pulverized in a pulping machine and dried to prepare the pulp.

The measured inherent viscosity of the obtained pulp is 4.4.

EXAMPLE 44

After a 2 liter reactor was completely dried by a sufficient purge with nitrogen, 500 ml of N-methyl-2-pyrrolidone (NMP) were charged into the reactor, followed by adding 30 g of $CaCl_2$ and 1.0 g of $AlCl_3$ into the solvent, mixing until completely dissolved to prepare the preliminary polymerization solvent and then adding and dissolving 24.5 g of 1,4-phenylenediamine.

After holding the resulting solution in the reactor for 5 minutes, the temperature was lowered to 20° C. by cooling with water and ice, followed by adding 45.95 g of terephthaloyl chloride, and polymerizing with vigorous stirring, to obtain liquid crystalline polymer solution. Then the temperature of the solution was raised to 50° C. and the solution was maintained at that temperature for 5 hours. At the end of this period, the polymer was mixed with aqueous 1 wt. % KOH solution to extract the polymerization solvent from the polymer, thereby separating the polymer. The separated polymer was pulverized in a pulping machine and dried to prepare the pulp.

The measured inherent viscosity of the obtained pulp is 4.4.

EXAMPLE 45

After 50000 ml of N-methyl-2-pyrrolidone (NMP) were charged into a tank (1) for preparing a polymerization solvent, 500 g of $CaCl_2$ and 3000 g of $AlCl_3$ were added and completely dissolved to prepare a preliminary polymerization solvent, which was transferred to a preliminary polymerization tank (2) through a transfer line (3) by using a transfer pump. Subsequently, 2450 g of 1,4-phenylenediamine (PPD) were added into the preliminary tank (2) and dissolved.

After the temperature of the completely dissolved resulting solution was lowered to 30° C it was transferred to a reactor (7) through a transfer line (4) by using a metering pump. At this time, the solution was charged continuously by constant amounts into the reactor (7). At the same time, 4595 g of terephthaloyl chloride contained in a raw materials reserving tanks (5) were charged continuously into the reactor (7) through a transfer line (6). At this time, the amounts of PPD solution and TPC were controlled to be equal molar amount. Then the mixture in the reactor (7) was reacted to prepare a liquid crystalline polymer solution, which was then extruded continuously through a discharge opening (8) into a maturing container (9).

The liquid crystalline polymer solution contained in the container was raised to 70° C. and was maintained for 0.5 hour. At the end of this period, the polymer was cut to an appropriate size and was immersed into water to extract the polymerization solvent, thereby separating the polymer. The separated polymer was pulverized in a pulping machine and dried to prepare pulp.

The measured inherent viscosity of the obtained pulp is 5.8.

EXAMPLE 46

After 40000 ml of hexamethylphosphoramide (HMPA) and 10000 ml of N,N,N',N'-tetramethylurea (TMU) was charged into a tank (1) for preparing a polymerization solvent, 3000 g of $AlCl_3$ were added and completely dissolved to prepare a preliminary polymerization solvent, which was transferred to a preliminary polymerization tank (2) through a transfer line (3) by using a transfer pump. Subsequently, 2450 g of 1,4-phenylenediamine (PPD) were added into the preliminary tank ( 2 ) and dissolved.

After the temperature of the completely dissolved resulting solution was lowered to 30° C. it was transferred to a reactor (7) through a transfer line (4) by using a metering pump. At this time, the solution was charged continuously by constant amounts into the reactor (7). At the same time, 4595 g of terephthaloyl chloride contained in a raw materials reserving tank (5) were charged continuously into the reactor (7) through a transfer line (6). At this time, the amounts of PPD solution and TPC were controlled to be equal molar amount. Then the mixture in the reactor (7) was reacted to prepare a liquid crystalline polymer solution, which was then extruded continuously through a discharge opening (8) into a maturing container (9).

The liquid crystalline polymer solution contained in the container was raised to 70° C. and was maintained for 3 hours. At the end of this period, the polymer was cut to an appropriate size and was immersed into water to extract the polymerization solvent, thereby separating the polymer. The separated polymer was pulverized in a pulping machine and dried to prepare pulp.

The measured inherent viscosity of the obtained pulp is 5.3.

EXAMPLE 47

After 50000 ml of N-methyl-2-pyrrolidone (NMP) were charged into a tank (1) for preparing a polymerization solvent, 2500 g of $CaCl_2$ and 1000 g of $MgCl_2$ were added and completely dissolved to prepare a preliminary polymerization solvent, which was transferred to a preliminary polymerization tank (2) through a transfer line (3) by using a transfer pump. Subsequently, 2450 g of 1,4-phenylenediamine (PPD) were added into the preliminary tank (2) and dissolved.

After the temperature of the completely dissolved resulting solution was lowered to 20° C., it was transferred to a reactor (7) through a transfer line (4) by using a metering pump. At this time, the solution was charged continuously by constant amounts into the reactor (7). At the same time, 4595.8 g of terephthaloyl chloride contained in a raw materials reserving tank (5) were charged continuously into the reactor (7) through a transfer line (6). At this time, the amounts of PPD solution and TPC were controlled to be equal molar amount. Then the mixture in the reactor (7) was reacted to prepare a liquid crystalline polymer solution, which was then extruded continuously through a extrude opening (8) into a maturing container (9).

The liquid crystalline polymer solution contained in the container was raised to 50° C. and was maintained for 2 hours. At the end of this period, the polymer was cut to an appropriate size and was charged into a pulping machine together with a mixed coagulating solution of 95 wt. % of water and 5 wt. % of polymerization solvent. The mixture was pulverized in the pulping machine and dried to prepare pulp.

The measured inherent viscosity of the obtained pulp is 6.8.

EXAMPLE 48

After 40000 ml of N-methyl-2-pyrrolidone (NMP) were charged into a tank (1) for preparing a polymerization solvent, 1000 g of $CaCl_2$ and 2500 g of $AlCl_3$ were added and completely dissolved to prepare a preliminary polymerization solvent, which was transferred to a preliminary polymerization tank (2) through a transfer line (3) by using a transfer pump. Subsequently, 2450 g of 1,4-phenylenediamine (PPD) were added into the preliminary tank (2) and dissolved.

After the temperature of the completely dissolved resulting solution was lowered to 20° C., it was transferred to a reactor (7) through a transfer line (4) by using a metering pump. At this time, the solution was charged continuously by constant amounts into the reactor (7). At the same time, 4595 g of terephthaloyl chloride contained in a raw materials reserving tank (5) were charged continuously into the reactor (7) through a transfer line (6). At this time, the amounts of PPD solution and TPC were controlled to be equal molar amount. Then the mixture in the reactor (7) was reacted to prepare a liquid crystalline polymer solution, which was then extruded continuously through a extrude opening (8) into a maturing container (9).

The liquid crystalline polymer solution contained in the container was raised to 60° C. and was maintained for 4 hours. At the end of this period, the polymer was cut to an appropriate size and was immersed into water to extract the polymerization solvent, thereby separating the polymer. The separated polymer was pulverized in a pulping machine and dried to prepare pulp.

The measured inherent viscosity of the obtained pulp is 5.9.

EXAMPLE 49

After 70000 ml of N-methyl-2-pyrrolidone (NMP) were charged into a tank (1) for preparing a polymerization solvent, 2000 g of $CaCl_2$ and 500 g of $AlCl_3$ were added and completely dissolved to prepare a preliminary polymerization solvent, which was transferred to a preliminary polymerization tank (2) through a transfer line (3) by using a transfer pump. Subsequently, 2450 g of 1,4-phenylenediamine (PPD) were added into the preliminary tank (2) and dissolved.

After the temperature of the completely dissolved resulting solution was lowered to 25° C. it was transferred to a reactor (7) through a transfer line (4) by using a metering pump. At this time, the solution was charged continuously by constant amounts into the reactor (7). At the same time, 4595 g of terephthaloyl chloride contained in a raw materials reserving tank (5) were charged continuously into the reactor (7) through a transfer line (6). At this time, the amounts of PPD solution and TPC were controlled to be equal molar amount. Then the mixture in the reactor (7) was reacted to prepare a liquid crystalline polymer solution, which was then extruded continuously through a extrude opening (8) into a maturing container (9).

The liquid crystalline polymer solution contained in the container was raised to 50° C. and was maintained for 2 hours. At the end of this period, the polymer was cut to an appropriate size and was immersed into water to extract the polymerization solvent, thereby separating the polymer. The separated polymer was pulverized in a pulping machine and dried to prepare pulp.

The measured inherent viscosity of the obtained pulp is 6.5.

EXAMPLE 50

After 50000 ml of N-methyl-2-pyrrolidone (NMP) were charged into a tank (1) for preparing a polymerization solvent, 3000 g of $CaCl_2$ and 100 g of $MgCl_2$ were added and completely dissolved to prepare a preliminary polymerization solvent, which was transferred to a preliminary polymerization tank (2) through a transfer line (3) by using a transfer pump. Subsequently, 2450 g of 1,4-phenylenediamine (PPD) were added into the preliminary tank (2) and dissolved.

After the temperature of the completely dissolved resulting solution was lowered to 20° C., it was transferred to a reactor (7) through a transfer line (4) by using a metering pump. At this time, the solution was charged continuously by constant amounts into the reactor (7). At the sale time, 4595 g of terephthaloyl chloride contained in a raw materials reserving tank (5) were charged continuously into the reactor (7) through a transfer line (6). At this time, the amounts of PPD solution and TPC were controlled to be equal molar amount. Then the mixture in the reactor (7) was reacted to prepare a liquid crystalline polymer solution, which was then extruded continuously through a extrude opening (8) into a maturing container (9).

The liquid crystalline polymer solution contained in the container was raised to 50° C. and was maintained for 5 hours. At the end of this period, the polymer was cut to an appropriate size and was immersed into aqueous 5 wt. % KOH solution to extract the polymerization solvent, thereby separating the polymer. The separated polymer was pulverized in a pulping machine and dried to prepare pulp.

The measured inherent viscosity of the obtained pulp is 5.3.

COMPARATIVE EXAMPLE 1

After a 2 liter reactor was completely dried by a sufficient purge with nitrogen, 500 ml of N-methyl-2-pyrrolidone (NMP) were charged into the reactor, followed by adding 25 g of $CaCl_2$ and 10 g of $AlCl_3$ into the solvent, mixing until completely dissolved to prepare the preliminary polymerization solvent and then adding and dissolving 24.5 g of 1,4-phenylenediamine.

After holding the resulting solution in the reactor for 5 minutes, the temperature was lowered to 0° C. by cooling with water and ice, followed by adding 45.95 g of terephthaloyl chloride, and polymerizing with vigorous stirring, to obtain liquid crystalline polymer solution. Then the temperature of the solution was raised to 150° C. and the solution was maintained at that temperature for 5 hours. At the end of this period, the polymer was mixed with water to extract the polymerization solvent from the polymer, thereby separating the polymer. The separated polymer was pulverized in a pulping machine and dried to prepare the pulp.

The measured inherent viscosity of the obtained pulp is 3.8.

COMPARATIVE EXAMPLE 2 (COMPARED TO EXAMPLE 31)

After 2 liter reactor was completely dried by a sufficient purge with nitrogen, 400 ml of N-methyl-2-pyrrolidone (NMP) were charged into the reactor, followed by adding 10 g of $CaCl_2$ and 30 g of pyridine into the solvent, mixing until completely dissolved to prepare the preliminary polymerization solvent and then adding and dissolving 24.5 g of 1,4-phenylenediamine for 10 minutes.

After the temperature of the resulting solution was lowered to 25° C. by cooling with water and ice, 45.95 g of terephthaloyl chloride was added and the mixture was polymerized with stirring to obtain a liquid crystalline polymer solution. The obtained polymer solution was heated to 60° C. and maintained for 4 hours, thereafter it was immersed into water to extract the polymerization solvent, thereby separating the polymer. The separated polymer was pulverized in a pulping machine and dried to be non-pulp type powders having no L/D. The measured inherent viscosity of the obtained polymer is 2.9.

COMPARATIVE EXAMPLE 2

After a 2 liter reactor was completely dried by a sufficient purge with nitrogen, 500 ml of N-methyl-2-pyrrolidone (NMP) were charged into the reactor, followed by adding 35 g of $CaCl_2$ into the solvent, mixing until completely dissolved to prepare the preliminary polymerization solvent and then adding and dissolving 24.5 g of 1,4-phenylenediamine for 10 minutes.

After the temperature of the resulting solution was lowered to 20° C. by cooling with water and ice, 45.95 g of terephthaloyl chloride was added and the mixture was polymerized with stirring to obtain a liquid crystalline polymer solution. The obtained polymer solution was heated to 50° C. and maintained for 5 hours, thereafter it was immersed into water to extract the polymerization solvent, thereby separating the polymer. The separated polymer was pulverized in a pulping machine and dried to prepare the pulp. The measured inherent viscosity of the obtained polymer is 2.8.

COMPARATIVE EXAMPLE 4

After a 2 liter reactor was completely dried by a sufficient purge with nitrogen, 500 ml of N-methyl-2-pyrrolidone (NMP) were charged into the reactor, followed by adding 0.45 g of $AlCl_3$ into the solvent, mixing until completely dissolved to prepare the preliminary polymerization solvent and then adding and dissolving 24.5 g of 1,4-phenylenediamine.

After holding the resulting solution in the reactor for 5 minutes, the temperature was lowered to 30° C. by cooling with water and ice, 45.95 g of terephthaloyl chloride was added and the mixture was polymerized with vigorous stirring to be slurry soon. Then the obtained polymer was raised to 70° C. and the polymer was maintained for 0.5 hour. At the end of this period, the polymer was mixed with water to extract the polymerization solvent from the polymer, thereby separating the polymer. The separated polymer was pulverized in a pulping machine and dried to form a non-pulp type powder having no L/D.

The measured inherent viscosity of the obtained pulp is 0.8.

As can be seen from the results of Examples 1 to 50 and comparative Examples 1 to 5, according to the present invention, it is possible to prepare an aromatic polyamide pulp having a high molecular weight through an easily controlled process without using the expensive tertiary amine required by the process of the prior art.

It will be apparent to those skilled in the art that various modifications and variations can be made in the present invention without departing from the scope or spirit of the invention. Thus, it is intended that the present invention cover the modifications and variations of this invention provided they come within the scope of the appended claims and their equivalents.

What is claimed is:

1. A process for the preparation of an aromatic polyamide pulp containing a homopolymer or copolymer with a repeating unit represented by the formula (I) or (II)

(I)

(II)

wherein each of $R_1$, $R_2$, and $R_3$ independently represents one of the following aromatic groups, X is —H, —Cl, —Br, —I, a $C_{1-4}$ alkyl group or a $C_{1-4}$ alkoxy group, Y is which comprises:
a) preparing a polymerization solvent by adding a Lewis acid compound to an amide-containing organic solvent, an urea-containing organic solvent or a mixture thereof;
b) preparing an anisotropic liquid crystalline polymer solution prior to gelation by dissolving an aromatic diamine in the prepared polymerization solvent, adding an aromatic diacid chloride to the solvent, and polymerizing said aromatic diamine and said aromatic diacid chloride;
c) continuously extruding the crystalline polymer solution into a maturing container;
d) maintaining the polymer solution at a predetermined temperature for a predetermined period to mature the polymer solution in said maturing container, wherein the viscosity of said polymer solution increases during maturation; and
e) pulverizing the polymer.

2. The process of claim 1 wherein step e) comprises immersing the polymer prepared by step d) into water, an aqueous basic solution or a mixed coagulating solution of the polymerization solvent with one of water and an aqueous basic solution to separate the polymerization solvent and pulverizing the polymer in a pulping machine.

3. The process of claim 2 wherein step e) comprises pulverizing the polymer prepared by step d), without separating the polymerization solvent, together with a mixed coagulating solution of the polymerization solvent with either water or an aqueous basic solution, and drying the polymer.

4. The process of claim 1 wherein one or more inorganic salts are further added and mixed into the polymerization solvent.

5. The process of claim 1 wherein the organic solvent is selected from the group consisting of N-methyl-2-pyrrolidone, N,N-dimentyl acetamide, hexamethyl phosphoramide, N,N,N',N'-tetramethylurea, N,N-dimethylformamide or mixtures thereof.

6. The process of claim 1 wherein the Lewis acid compound is selected from the group consisting of a transition metal halide and a compound of a halogen element combined with an element selected from groups IIIA, IVA, VA and VIA of the periodic table.

7. The process of claim 6 wherein the Lewis acid compound is selected from the group consisting of $BF_3$, $BCl_3$, $AlCl_3$, $FeCl_2$, $FeCl_3$, $ZnCl_2$, $SbCl_2$, $HgCl_2$ and $MgCl_2$.

8. The process of claim 6 wherein the amount of acid added is from 0.1 to 15% by weight based on the total weight of organic solvent.

9. The process of claim 4 wherein the inorganic salt is selected from the group consisting of the $CaCl_2$, LiCl, NaCl, KCl, LiBr and KBr.

10. The process of claim 4 wherein the amount of the inorganic salt added is from 0.1 to 12% by weight based on the total weight of organic solvent.

11. The process of claims 4 wherein the total amount of Lewis acid compound and inorganic salts added is from 2.0 to 25% by weight based on the total weight of organic solvent.

12. The process of claim 11 wherein the total amount of Lewis acid compound and inorganic salts added is from 3.0 to 13% by weight based on the total weight of organic solvent.

13. The process of claim 1 wherein the liquid crystalline polymer solution is maintained at a temperature of from 25° to 100° C. for at least 0.5 hour.

14. The process of claim 13 wherein the liquid crystalline polymer solution is maintained at a temperature of from 25° to 100° C. for from 0.5 to 5 hours.

15. The process of claim 2 wherein the aqueous basic solution is selected from the group consisting of aqueous solutions of NaOH, KOH, $Na_2CO_3$, $K_2CO_3$, $NaH_2CO_3$, $Ca(OH)_2$ and CaO.

16. The process of claim 15 wherein the concentration of the aqueous basic solution is from 0.1 to 20% by weight.

17. The process of claim 1 wherein the content of the polymer in the polymer solution is from 3 to 30% by weight based on the total weight of organic solvent.

* * * * *

UNITED STATES PATENT AND TRADEMARK OFFICE
CERTIFICATE OF CORRECTION

PATENT NO. : 5,324,811
DATED : June 28, 1994
INVENTOR(S) : Seog C. You et al.

It is certified that error appears in the above-indentified patent and that said Letters Patent is hereby corrected as shown below:

Claim 1, column 29, Formulas I and II change

Claim 1, column 30, lines 26-28 change

Claim 3, column 30, line 57, change "claim 2" to --claim 1--.

Claim 5 column 30, line 68, change "dimentyl" to --dimethyl--.

Claim 8, column 31, line 12 before "acid" insert --the Lewis--.

UNITED STATES PATENT AND TRADEMARK OFFICE
CERTIFICATE OF CORRECTION

PATENT NO. : 5,324,811
DATED : June 28, 1994
INVENTOR(S) : Seog C. You, et. al.

It is certified that error appears in the above-indentified patent and that said Letters Patent is hereby corrected as shown below:

Claim 11, column 31, line 21, change "claims" to --claim--.

Signed and Sealed this

Twenty-seventh Day of August, 1996

Attest:

BRUCE LEHMAN

Attesting Officer

Commissioner of Patents and Trademarks